Patented May 8, 1951

2,552,227

UNITED STATES PATENT OFFICE 2,552,227

METHOD FOR PREPARING ESTERS OF 1,1,3-ALKANETRIOLS

Curtis W. Smith and Douglas G. Norton, Berkeley, Calif., assignors to Shell Development Company, San Francisco, Calif., a corporation of Delaware No Drawing. Application November 12, 1946, Serial No. 709,084

14 Claims. (Cl. 260—491)

This invention relates to a method of preparing triesters in the 1,1,3-triacyloxyalkane series of compounds. More particularly, the present invention relates to a method of preparing triesters in the 1,1,3-triacyloxyalkane series of compounds comprising reacting a 1,1-diacyloxy-2-alkene with a carboxylic acid in the presence of a suitable catalytically active acidic substance, to effect addition of the carboxylic acid to the olefinic bond in the 2-position of the 1,1-diacyloxy-2-alkene with direct formation thereby of the 1,1,3-triacyloxyalkane.

The method of the present invention comprises, in particular, reacting a diester of an alpha,beta-unsaturated aldehyde with a carboxylic acid to produce a compound in the 1,1,3-triacyloxyalkane series of compounds according to the equation.

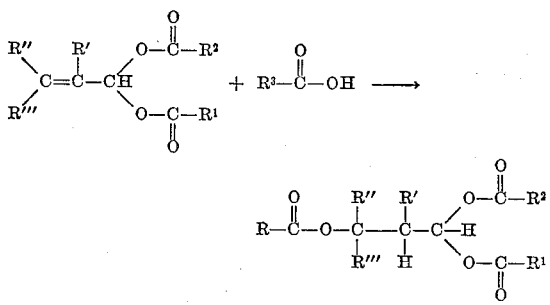

wherein $R^1$, $R^2$, and $R^3$ represent monovalent organic radicals which may be either substituted hydrocarbon radicals or unsubstituted hydrocarbon radicals or heterocyclic radicals, and which may be either the same or different; and $R'$, $R''$ and $R'''$ represent either the same or different members of the class consisting of the hydrogen atom, and organic radicals. The organic radicals that may be represented by each of $R^1$, $R^2$, $R^3$, $R'$, $R''$ and $R'''$ may be cyclic or acyclic, aromatic or non-aromatic, saturated or unsaturated, and may be composed solely of carbon and hydrogen atoms or may contain in addition to carbon and hydrogen atoms, atoms of one or more other elements, provided such other atoms are not of a kind or in a position in the molecule to prevent or to hinder undesirably the reaction, or to split off, or otherwise to interfere in any way with the successful execution of the process. Among the organic groups which thus may be represented by $R^1$, $R^2$, $R^3$, $R'$, $R''$ and $R'''$ in the foregoing equation are, for example, alkyl, aryl, cycloalkyl, aralkyl, alkaryl, alkenyl, alkenaryl, aralkenyl, cycloalkenyl, alkynyl and similar organic groups. Atoms of elements other than hydrogen and carbon which may be present in such organic groups include, for example, oxygen, sulfur, nitrogen, phosphorus, halogen, and the like, as in ethereal oxygen atoms, sulfolanyl groups, amino nitrogen atoms, hydroxylic oxygen atoms, phosphate groups, and the like. Heterocyclic radicals which may be represented by $R^1$, $R^2$, $R^3$, $R'$, $R''$ and/or $R'''$ in the above formulas, include those cyclic radicals whose ring members include carbon atoms and one or more atoms of an element other than carbon, such as one or more oxygen atoms, one or more nitrogen atoms, or one or more sulfur atoms. It has been found to be particularly convenient to have $R^1$, $R^2$, and $R^3$ represent lower aliphatic radicals such as lower alkyl groups, containing up to eight carbon atoms. $R'$, $R''$ and $R'''$ preferably are those substituent groups which contain, if any, only relatively unreactive carbon-to-carbon bonds, such as saturated carbon-to-carbon bonds or aromatic carbon-to-carbon bonds, and thus preferably represent either hydrogen or saturated or aromatic hydrocarbon groups or saturated heterocyclic groups, such as methyl, ethyl, propyl, isopropyl, butyl, pentyl, cyclopentyl, hexyl, cyclohexyl, phenyl, tolyl, furfuryl, sulfolanyl, and the like and their homologs.

It has been found to be particularly convenient to employ in the process of the present invention the diesters of the alpha,beta-unsaturated aldehydes which have a terminal methylene group in the beta position, forming by reaction thereof with a carboxylic acid, preferably a lower fatty acid, triesters according to the equation

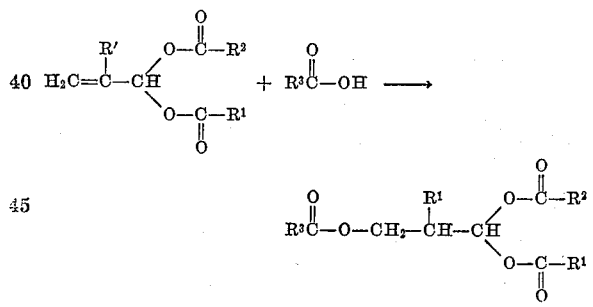

For example, 1,1-diacetoxy-2-propene may be reacted with acetic acid according to the process of the present invention to form 1,1,3-triacetoxypropane; 1,1-diacetoxy-2-methyl-2-propene may be reacted with acetic acid in accordance with the present process to form 1,1,3-triacetoxy-2- methylpropane; and homologous and analogous 1,1-diacyloxy-2-propenes may be reacted with a carboxylic acid to form in an analogous manner the corresponding 1,1,3-triacyloxypropanes having structures represented, in a preferred case, by the formula

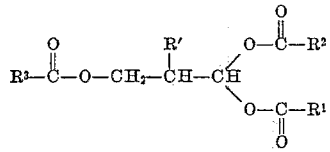

wherein $R^1$, $R^2$ and $R^3$ represent alkyl groups and $R'$ represents either hydrogen or an alkyl group.

The diesters in the 1,1-diacyloxy-2-alkene series of compounds may be prepared in any suitable manner, such as by the reaction of an alpha, beta-unsaturated aldehyde with a carboxylic acid anhydride, or by reaction of a metal salt, such as a silver, lead or sodium salt, of a carboxylic acid with an alkylidene halide. A method which is particularly advantageous for the preparation of the 1,1-diacyloxy-2-alkene comprises reacting an alpha,beta-unsaturated aldehyde with a carboxylic acid anhydride, if desired in the presence of a catalyst such as a suitable acid or acid-reacting material, e. g., sulfuric acid, phosphoric acid, oxalic acid, stannous chloride, zinc chloride, ferric chloride, etc., sulfuric acid being preferred, to form thereby the 1,1-diacyloxy-2-alkene in accordance with the equation:

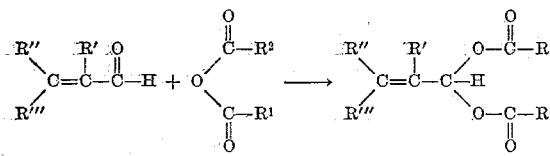

wherein $R^1$, $R^2$, $R'$, and $R''$, and $R'''$, have their previous significance. It will be appreciated that in the foregoing formulas, $R^1$ and $R^2$ may be either separate organic radicals, or they may be radicals that are linked together to form, for example, a cyclic anhydride of a polybasic acid. The reaction may be effected, for example, in the presence of the acid or acid-reacting material present in catalytic amounts such as from about 0.1% to about 5% by weight of the reactants, at a temperature between about 0° C. and about 20° C. or higher, and in the presence of a suitable inert organic solvent if desired. Among the unsaturated aldehydes which thus may be used are, for example, acrolein, methacrolein, crotonaldehyde, alpha-ethylacrolein, alpha-phenylacrolein, alpha - cyclohexylcrotonaldehyde, alpha,beta-diethylacrolein, and analogous and homologous alpha,beta-unsaturated aldehydes. Carboxylic acid anhydrides which may be employed include, for example, acetic anhydride, propionic anhydride, butyric anhydride, benzoic anhydride, tetrahydrophthalic anhydride, mixed anhydrides such as formic-acetic anhydride, acetic-propionic anhydride, and analogous and homologous anhydrides.

The reaction between the 1,1-diacyloxy-alkene and the carboxylic acid is effected in accordance with the present invention by bringing the two reactants into effective contact in the presence of a suitable catalyst, under conditions of temperature, time, proportions of the reactants and amount of catalyst that are effective in promoting the desired reaction and that are not conducive to undesired side reactions, decomposition reactions, or the like.

Suitable catalysts which may be employed in accordance with the present invention comprise, in general, acidic materials, or acid-reacting substances, or substances which are capable of acting as acids of sufficient strength under the conditions employed for effecting the reaction and which are stable in respect to their acidic character under the existing conditions. The catalyst thus may be either a free acid, or it may be a suitable acid-reacting substance such as an acid-reacting salt, or the like. The acid-reacting material that is employed as the catalyst in the process of the present invention desirably is one having an acid strength substantially greater than acetic acid, strongly acid materials such as the strong mineral acids or other acid-reacting substances having an equivalent degree of acidity being particularly suitable for use as the catalyst in the process. Among the acid-reactive materials which thus are suitable for use as the catalyst in the process of the present invention are included for example, the strong mineral acids such as sulfuric acid, hydrochloric acid, orthophosphoric acid, and the like, acid reacting salts, such as sodium acid sulfate, sodium dihydrogen phosphate, potassium dihydrogen phosphate, organic acids of sufficient acidic strength such as monochloroacetic acid, dichloroacetic acid, trichloroacetic acid, oxalic acid, para-toluene sulfonic acid and other arylsulfonic acids, and the like. The strong mineral acids, sulfuric acid and phosphoric acid have been employed with general and particular success. The amount of the catalyst to be employed depends upon the identity of the particular catalyst, the particular reactants that are involved, and upon the conditions under which the process is to be executed. When a strong mineral acid is to be employed as the catalyst, amounts of the catalyst corresponding to from about 0.001 per cent to about 5 per cent by weight of the two reactants generally are suitable, although these quantities are subject to considerable variation under appropriate circumstances. Larger amounts of acidic materials that have a lower acidic strength than the strong mineral acids, may be employed. The optimum amount of catalyst within the more general range also is a function of the otherwise existing conditions of the reaction. For example, the reaction of 1,1-diacetoxy-2-propene and of 1,1-diacetoxy-2-methyl-2-propene with acetic acid to form 1,1,3-triacetoxypropane and 1,1,3-triacetoxy-2-methylpropane, respectively, may be executed with particular effectiveness in the presence of from about 0.05 to about 0.5 per cent by weight of the reactants of sulfuric acid or phosphoric acid.

The process of the present invention may be executed by heating, or by otherwise maintaining at a suitable reaction temperature, a reaction mixture comprising the 1,1-diacyloxy-2-alkene and the carboxylic acid to be reacted therewith, in the presence of a catalytically active material such as those referred to immediately above. The catalyst, if normally a liquid or if adapted to be dissolved in a suitable liquid medium such as an organic solvent, e. g., an ether, a hydrocarbon, etc., may be added directly to the reaction mixture prior to effecting the reaction. Alternatively, the catalyst, if a solid, may be contacted with the reaction mixture in any suitable manner, as by suspending or agitating finely divided catalyst in the reaction mixture, or by contacting the reaction mixture with the catalyst in more massive state. If desired, the acidic material may be supported on or carried by an inert support, such as an inert supporting material impregnated, coated, or otherwise treated with the catalytically active substance, and the reaction effected by contacting the reaction mixture therewith in any effective manner under suitable conditions of time and temperature and the like.

The process of the present invention may be executed with either the 1,1-diacyloxy-2-alkene or the carboxylic acid to be reacted therewith present in excess. A suitable range of proportions of the reactants in the reaction mixture comprises, for example, from about 1 to about 3 moles of the carboxylic acid per mole of the 1,1-diacyloxy-2-alkene. Generally speaking, however, it is preferred to employ at least an amount of the carboxylic acid equivalent to the amount of 1,1-diacyloxy-2-alkene that is present, the use of the two reactants in the theoretical proportions, i. e., in equimolar quantities, frequently being particularly convenient. If the two reactants are mutually soluble, or miscible, the reaction mixture may consist solely of the reactants and the catalyst. If the reactants are not mutually soluble, or if it is desired to obtain at the temperature of reaction a more mobile reaction mixture than otherwise would result, a suitable inert organic solvent such as an ether, a hydrocarbon, a chlorinated hydrocarbon, or the like, may be added in an amount sufficient to dissolve at least a portion of the reactants, but preferably in a minor amount, to the reaction mixture.

The temperature at which the reaction between the carboxylic acid and the 1,1-diacyloxy-2-alkene may be effected depends upon the particular reactants that are involved, upon the identity and the amount of the catalyst, and upon similar considerations. Reaction temperatures of from about 30° C. to about 150° C. may be employed effectively, the more limited range of from about 30° C. to about 90° C. being generally preferable.

The process of the invention may be effected in either a batch-wise, an intermittent, or a continuous manner, and any suitable type of apparatus may be employed.

The desired reaction may be effected with the reactants either in the liquid state, or in the vapor state as under reduced pressure or under atmospheric pressure. In the case of batch-wise operation, for example, the reactants, either separately or previously mixed, may be introduced into a reaction vessel such as one equipped with means for providing agitation and means for obtaining and maintaining a suitable reaction temperature. The catalyst, preferably as a liquid may be added either to one or both of the reactants or to the mixture thereof, and the resultant reaction mixture then may be maintained at the desired temperature for a time sufficient to effect the desired reaction. When the process is to be executed in a continuous manner, a fluid mixture comprising the two reactants and the catalyst may be passed in a continuous stream through a reaction tube maintained at the desired temperature, or a stream of the two reactants in admixture may be contacted with a solid catalytic mass such as a porous support impregnated with a catalytically active acidic material, in either case the duration of contact, or the reaction time, being correlated with the other conditions of the process to obtain the desired results.

After completion of the reaction, the 1,1,3-triacyloxyalkane may be recovered, or separated from the reaction mixture in any suitable manner. Any acidic catalyst present in the mixture may be neutralized by the addition of a suitable base, or basic salt, in an amount at least equivalent thereto. For example, when an acid such as sulfuric acid or phosphoric acid has been employed as the catalyst, sodium acetate, pyridine, sodium hydroxide, or any other suitable alkaline material may be added in a calculated amount sufficient to react with the catalyst to form a salt less acidic than the free catalyst. Neutralization of any excess of the carboxylic acid reactant is not necessary. The triester reaction product then may be recovered from the reaction mixture as by fractional distillation, treatment with selective solvents, or in any other effective manner, as will be apparent to those skilled in the art.

The following examples will serve to illustrate certain specific embodiments of the present invention without, however, the intent of limiting the invention other than as it is defined by the appended claims.

Example I

A mixture of 100 parts by weight of 1,1,-diacetoxy-2-propene, 38 parts by weight of glacial acetic acid, and 1.4 parts of a 10 per cent by volume solution of sulfuric acid in diethyl ether was maintained at 50° C. for eighteen hours. The mixture then was cooled and 0.5 part of sodium acetate was added. Upon fraction distillation of the resultant mixture, 1,1,3-triacetoxypropane, distilling at 90° C. to 98° C. under a pressure of 0.6 millimeter of mercury, was recovered in a yield of 34.5 per cent based on the amount of 1,1-diacetoxy-2-propene consumed and in a conversion of 1,1-diacetoxy-2-propene to 1,1,3-triacetoxypropane of 22.5 per cent. Redistillation of the fraction thus obtained provided a fraction of 1,1,3-triacetoxypropane distilling at 100° C. to 101° C. under a pressure of 0.8 millimeter of mercury, and having a refractive index ($N_D^{20}$) of 1.4270.

Example II

Equimolar parts of 1,1-diacetoxy-2-methyl-2-propene and acetic acid were mixed and phosphoric acid was added in an amount corresponding to 0.15 per cent by weight of the mixture. The resultant mixture was maintained at 80° C. for 12 hours. Sufficient sodium acetate was added to the resultant mixture to neutralize the phosphoric acid, and the mixture was fractionally distilled under reduced pressure. The fraction distilling at 95° C. to 100° C. under a pressure of 1.5 millimeters of mercury was separated and redistilled under a pressure of 2 millimeters mercury. The fraction distilling at 99° C. to 100° C. was collected and found, by suitable analyses, to be composed largely of 2-methyl-1,1,3-triacetoxypropane. The infra-red absorption spectrum of this sample was similar to the infra-red spectrum of the 1,1,3-triacetoxypropane prepared in Example I, with a strong absorption band at a wave length of 5.705 microns.

We claim as our invention:

1. A process for the preparation of triesters which comprises reacting an aliphatic monocarboxylic acid diester of 2-propene-1,1-diol with an aliphatic monocarboxylic acid in the presence of a catalytic amount of a strong mineral acid to produce a monocarboxylic acid triester of 1,1,3-propanetriol.

2. A process for the preparation of triesters which comprises heating in admixture at a temperature of from about 30° C. to about 150° C.

an aliphatic monocarboxylic acid diester of a 2-alkene-1,1-diol and an aliphatic monocarboxylic acid in the presence of from about 0.001% to about 5% by weight of a strong mineral acid whereby there is produced an aliphatic monocarboxylic acid triester of the 1,1,3-alkanetriol containing the same number and arrangement of carbon atoms as said 2-alkene-1,1-diol.

3. A process for the preparation of triesters which comprises heating a fatty acid diester of a 2-alkene-1,1-diol with a fatty acid at a temperature of from about 30° C. to about 150° C. in the presence of a catalytic amount of an acid reacting material having an acidic strength greater than that of the fatty acid whereby there is produced a fatty acid triester of the 1,1,3-alkanetriol containing the same number and arrangement of carbon atoms as said 2-alkene-1,1-diol.

4. A process for the preparation of triesters which comprises reacting a monocarboxylic acid diester of a beta,gamma-unsaturated geminal diol with a monocarboxylic acid in the presence of a catalytic amount of an acid-reacting substance to produce a monocarboxylic acid triester of the gamma-hydroxy beta,gamma-saturated geminal diol containing the same number and arrangement of carbon atoms as the 2-alkene-1,1-diol.

5. A method of preparing 1,1,3-triacetoxypropane comprising heating a mixture of 1,1,-diacetoxy-2-propene and acetic acid containing from about 0.001 to about 5 per cent by weight of a strong mineral acid at a temperature of from about 30° C. to about 150° C., and recovering 1,1,3-triacetoxypropane from the mixture.

6. A method of preparing 1,1,3-triacetoxy-2-methylpropane comprising heating a mixture of 1,1-diacetoxy-2-methyl-2-propene and acetic acid containing from about 0.001 to about 5 per cent by weight of a strong mineral acid at a temperature of from about 30° C. to about 150° C., and recovering 1,1,3-triacetoxy-2-methylpropane from the mixture.

7. A method of preparing 1,1,3-triacetoxypropane which comprises reacting 1,1-diacetoxy-2-propene with acetic acid in the presence of from about 0.001 to about 5 per cent by weight of sulfuric acid.

8. A method of preparing 1,1,3-triacetoxypropane which comprises reacting 1,1-diacetoxy-2-propene with acetic acid in the presence of from about 0.001 to about 5 per cent by weight of phosphoric acid.

9. A method of preparing 1,1,3-triacetoxy-2-methylpropane which comprises reacting 1,1-diacetoxy-2-methyl-2-propene with acetic acid in the presence of from about 0.001 to about 5 per cent by weight of sulfuric acid.

10. A method of preparing 1,1,3-triacetoxy-2-methylpropane which comprises reacting 1,1-diacetoxy-2-methyl-2-propene with acetic acid in the presence of from about 0.001 to about 5 per cent by weight of a strong mineral acid.

11. A method of preparing a 1,1,3-triacetoxyalkane which comprises reacting a 1,1-diacetoxy-2-alkene with acetic acid in the presence of a catalytic amount of a strong mineral acid.

12. A method of preparing 1,1,3-triacyloxypropanes which comprises reacting 1,1-diacyloxy-2-propenes wherein the acyl groups are acyl groups of aliphatic monocarboxylic acids with aliphatic monocarboxylic acids in the presence of a catalytic amount of a strong mineral acid.

13. A method of preparing 1,1,3-triacyloxypropanes which comprises reacting 1,1-diacyloxy-2-propenes wherein the acyl groups are acyl groups of aliphatic monocarboxylic acids with aliphatic monocarboxylic acids in the presence of from about 0.001 to about 5 per cent by weight of sulfuric acid.

14. A method of preparing 1,1,3-triacyloxypropanes which comprises reacting 1,1-diacyloxy-2-propenes wherein the acyl groups are acyl groups of aliphatic monocarboxylic acids with aliphatic monocarboxylic acids in the presence of from about 0.001 to about 5 per cent by weight of phosphoric acid.

CURTIS W. SMITH.
DOUGLAS G. NORTON.

REFERENCES CITED

The following references are of record in the file of this patent:

UNITED STATES PATENTS

| Number | Name | Date |
|---|---|---|
| 1,365,052 | Ellis | Jan. 11, 1921 |
| 2,065,540 | Schneider | Dec. 29, 1936 |
| 2,393,740 | Brant et al. | Jan. 29, 1946 |

FOREIGN PATENTS

| Number | Country | Date |
|---|---|---|
| 313,696 | Germany | July 19, 1919 |

OTHER REFERENCES

Wegscheider et al.: Monat. fur Chem., vol. 31 (1910) pp. 1006, 1018.

Fischer et al.: Ber. Deut. Chem., vol. 62 (1929) p. 862.